US005898008A

United States Patent [19]

Kolker et al.

[11] Patent Number: 5,898,008

[45] Date of Patent: Apr. 27, 1999

[54] PORE-FREE SINTERED BODIES ON THE BASIS OF SILICON CARBIDE WHICH ARE SUITABLE AS SUBSTRATES FOR HARD DISKS, AND METHODS FOR THE FABRICATION THEREOF

[75] Inventors: Helmut Kolker, Munich, Germany; Lorenz Sigl, Lechaschau, Austria; Thomas Kempf, Kempten, Germany

[73] Assignee: Elektroschmelzwerk Kempten GmbH, Munich, Germany

[21] Appl. No.: 08/902,001

[22] Filed: Jul. 29, 1997

[30] Foreign Application Priority Data

Aug. 6, 1996 [DE] Germany .......................... 196 31 763

[51] Int. Cl.[6] .................................................. C04B 35/569

[52] U.S. Cl. ......................... 501/89; 501/92; 428/694 ST

[58] Field of Search ................. 501/89, 92; 428/694 ST

[56] References Cited

U.S. PATENT DOCUMENTS

| | | | |
|---|---|---|---|
| 4,502,983 | 3/1985 | Omori et al. | 501/89 |
| 4,598,017 | 7/1986 | Bayer et al. | 428/336 |
| 4,738,885 | 4/1988 | Matsumoto . | |
| 4,829,027 | 5/1989 | Cutler et al. | 501/89 |
| 5,298,470 | 3/1994 | Chia et al. | 501/89 |
| 5,302,561 | 4/1994 | Ezis . | |
| 5,358,685 | 10/1994 | Ezis . | |
| 5,465,184 | 11/1995 | Pickering et al. . | |
| 5,474,613 | 12/1995 | Pickering et al. . | |
| 5,480,695 | 1/1996 | Tenhover et al. . | |
| 5,591,685 | 1/1997 | Mitomo et al. | 501/89 |
| 5,623,386 | 4/1997 | Sullivan | 360/135 |
| 5,656,218 | 8/1997 | Lin et al. | 501/89 |

OTHER PUBLICATIONS

Ullmann's Encyclopedia of Industrial Chemistry, vol. A 23 pp. 734 to 736.

*Primary Examiner*—Karl Group
*Attorney, Agent, or Firm*—Burgess, Ryan & Wayne

[57] ABSTRACT

Dense sintered bodies are provided which a) comprise from 45 to 99.5 wt % of SiC, the SiC being present in the sintered body as a crystalline first phase, and b) comprise from 0.5 to 55 wt % of a sintering aid, from 0.5 to 30 wt % of which is selected from the group consisting of reaction products of $Al_2O_3$ with $Y_2O_3$, mixtures of at least one nitrogen-containing aluminum compound with reaction products of $Al_2O_3$ with $Y_2O_3$, mixtures of at least one rare earth oxide with at least one nitrogen-containing aluminum compound and/or $Al_2O_3$, and from 0 to 25 wt % of which is selected from the group of the nitridic silicon compounds, the sintering aid being present in the sintered body as a second phase and optionally further phases, wherein the second phase and optionally the further phases are either amorphous to an extent of more than 10% or are present in amorphous form at the interface to the first phase to a width of at least $\geqq 5$ Å, and the polished surface of the sintered body does not contain any pores having a diameter >1 $\mu$m.

6 Claims, No Drawings

PORE-FREE SINTERED BODIES ON THE BASIS OF SILICON CARBIDE WHICH ARE SUITABLE AS SUBSTRATES FOR HARD DISKS, AND METHODS FOR THE FABRICATION THEREOF

BACKGROUND OF THE INVENTION

1) Field of the Invention

The invention relates to pore-free sintered bodies on the basis of silicon carbide which are suitable as substrates for hard disks in magnetic disk drives, and to methods for the fabrication thereof.

2) Background Art

Materials suitable as substrates for hard disks must be amenable to extremely high-quality polishing, with a high flatness and low porosity (IDEMA specifications) and a roughness "Ra" below 100 Å, preferably below 10 Å. They must be very stiff so that, in the usual form of thin disks (for example 65Ø×20Ø×0.635 mm), they will not distort when mounted in the drive or under their own weight or when being heated to about 300–600° C. while the magnetic layers are being sputtered on or when they rotate in the drive at e.g. 7500 rpm. Otherwise, a uniform distance of the read-write head would not be ensured and reading and writing of data in the magnetic layer would give rise to errors. Moreover there would be the risk of the disk colliding with the head and possibly being destroyed.

Furthermore, the substrate material is required to be very hard so that an occasional collision with the read-write head will not result in deformations in the substrate and loss of data.

As a material, SiC is distinctly superior, in all these points, to the substrates already being used:

a) aluminum with Ni/P coating b) glass or glass ceramics.

Its modulus of elasticity, as a measure for its stiffness, is about 400 Gpa and thus about 5 times the modulus of elasticity of a) or b) and its hardness (HV 2500) is likewise about 4 times as high as that of a) or b).

In addition, its thermal stability allows higher sputtering temperatures, resulting in potentially superior magnetic layers. Thus, the sputtering temperature in the case of a) is limited to ≦300° C., because the material will otherwise become magnetic. In the case of glass, with the chemical hardening customary for this application, the sputtering temperature is limited to about 400° C. because above this temperature, ion diffusion will result in the hardness effect being lost and there is a risk of deformation.

SiC, in contrast, remains unchanged even at higher sputtering temperatures aimed for, e.g. 500° C.

On a long-term basis, SiC therefore provides for thinner and consequently lighter disks (energy consumption/volumetric data density), higher rotational speeds (more rapid access to data) and lower flying heights (more bits/$cm^2$) than Al or glass or glass ceramics.

Moreover, for novel substrates for hard disks to be able to compete with the known materials, it ought to be possible to produce them at a low price.

One of the first publications in which SiC is proposed for hard disks is U.S. Pat. No. 4,738,885 (Kyocera) which issued Apr. 19, 1988. The patent states that ceramics sintered at atmospheric pressure are usually highly porous and that hot isostatic pressing is necessary after sintering to close the pores.

U.S. Pat. No. 5,465,184 (CVD Inc.) issued Nov. 7, 1995 and U.S. Pat. No. 5,474,613 (CVD Inc.) issued Dec. 12, 1995 disclose pore-free free-standing CVD-SiC substrates for use as hard disks. Referring to sintered SiC, this publication states that the said material always contains pores.

U.S. Pat. No. 5,480,695 (Tenhover) which issued Jan. 2, 1996 exhaustively discusses the prior art in the field of ceramic substrates for hard disks and discloses a sintered SiC hard disk substrate whose porosity is covered over by a dense, nonstoichiometric SiC layer sputtered onto it. Regarding the sintered material SiC, it is stated that this material is inherently porous and without a coating is therefore not suitable for the fabrication of hard disks.

U.S. Pat. No. 5,302,561 which issued Apr. 12, 1994 and U.S. Pat. No. 5,358,685 which issued Oct. 25, 1994 (Cercom) disclose a special hot-pressed SiC and the corresponding production process. The description states said SiC to be free of pores and that no grains are polished out during polishing and that it is therefore suitable for use as a hard disk.

The only materials known in the prior art which are suitable for the fabrication of hard disks are therefore SiC sintered under pressure (via hot pressing or hot isostatic pressing) or CVD SiC deposited from the gas phase. SiC sintered at atmospheric pressure in this context, given its porosity, requires a coating. So far, all these processes have failed, on technical grounds and on the grounds of cost, to become generally accepted.

It is therefore desirable for materials on the basis of silicon carbide for the fabrication of hard disks to be available which can be produced by means of cost-effective sintering methods.

SUMMARY OF THE INVENTION

The present invention relates to dense sintered bodies which comprise:

a) from 45 to 99.5 wt % of SiC, the SiC being present in the sintered body as a crystalline first phase, and b) from 0.5 to 55 wt % of a sintering aid, from 0.5 to 30 wt % of which is selected from the group consisting of reaction products of $Al_2O_3$ with $Y_2O_3$, mixtures of at least one nitrogen-containing aluminum compound with reaction products of $Al_2O_3$ with $Y_2O_3$, mixtures of at least one rare earth oxide with at least one nitrogen-containing aluminum compound and/or $Al_2O_3$, and from 0 to 25 wt % of which is selected from the group of the nitridic silicon compounds, the sintering aid being present in the sintered body as a second phase and optionally further phases, wherein the second phase and optionally the further phases are either amorphous to an extent of more than 10% or are present in amorphous form at the interface to the first phase to a width of at least ≧5 Å and where the polished surface of the sintered body does not contain any pores having a diameter ≧1 μm.

DESCRIPTION OF THE PREFERRED EMBODIMENTS

The preferred rare earth oxide is $Y_2O_3$. The preferred nitrogen-containing aluminum compound is AlN. The preferred nitridic silicon compound is $Si_3N_4$.

All the wt % specifications are based on the total amount weighed in each case.

Preferably, the sintered body according to the invention contains, as the nitridic silicon compound, from 0 to 25 wt % of $Si_3N_4$, preferably from 0 to 10 wt % of $Si_3N_4$.

The sintered body according to the invention preferably comprises from 70 to 99 wt %, particularly preferably from 82 to 98 wt % of SiC.

The fabrication of the novel sintered body preferably employs sintering aids which are selected from the group consisting of yttrium aluminum garnet (YAG), yttrium aluminum melilite (YAM), yttrium aluminum perovskite (YAP), a mixture of $Al_2O_3$ with $Y_2O_3$, a mixture of AlN with $Y_2O_3$, a mixture of $Al_2O_3$ with AlN and with $Y_2O_3$, a mixture of YAG, YAM or YAP with AlN.

These sintering aids are preferably present in the sintered body in amounts of from 1 to 20, particularly preferably of from 2 to 8 wt %. The sintering aid preferably includes 0.5 to 8 wt % of one selected from the group consisting of reaction products of $Al_2O_3$ with $Y_2O_3$, mixtures of at least one nitrogen-containing aluminum compound with reaction products of $Al_2O_3$ with $Y_2O_3$ and mixtures of at least one rare earth oxide with at least one nitrogen-containing aluminum compound and/or $Al_2O_3$, and from 0–7.5 wt % nitridic compounds.

Preferably, more than 10% of the sintering aids in the novel sintered body are present as an amorphous phase.

Particularly preferably, more than 50% of the sintering aids in the novel sintered body are present as an amorphous phase.

Especially preferably, more than 80% of the sintering aids in the novel sintered body are present as an amorphous phase.

For the purposes of the invention, amorphous phase should be understood as a glassy, noncrystalline phase. The amorphous phase can be characterized in a manner known per se, e.g. via high-resolution transmission electron microscopy. Appropriate methods are known in the prior art.

Preferably, no pores having a diameter >0.8 μm are present on the polished surface of the novel sintered body, particularly preferably, no pores having a diameter >0.4 μm.

The production of the novel sintered bodies is effected by suitable SiC powders being blended, in a manner known per se, with said sintering aids and optionally, aids for the preparation of green bodies, by a green body being molded in a known manner (e.g. by means of die pressing, cold isostatic pressing, injection molding or tape casting), by the green body being converted into the dense sintered body by hot pressing, hot isostatic pressing or sintering under a gas atmosphere pressure, followed by an after treatment by means of grinding, lapping or polishing. In the process, the disk-like shape desired for the use as a hard disk is either produced in the green body (e.g. by means of die pressing or tape casting followed by blanking or cold isostatic pressing followed by the disks being sawed out) or by the disks being sawed out from the sintered body.

A sintered body according to the invention can be produced, for example, by blending from 45 to 99.5 wt % of SiC powder, in a manner known per se, with from 0.5 to 55 wt % of said sintering additives and optionally, conventional aids for producing green bodies and then shaping, to obtain the green body, said green body being sintered at a temperature of from 1800 to 2200° C. over a period of from 15 to 300 min under an $N_2$ or argon atmosphere and being optionally redensified for up to 150 min at elevated gas pressure up to about 2000 bar and then, by means of methods known per se, being optionally sawed and lapped and polished.

To produce the novel SiC sintered bodies, the raw SiC powder used is advantageously commercially available α-SiC having a particle size <10 μm, preferably having a specific surface area of >5 $m^2/g$ (measured in accordance with BET). It is equally possible, however, to use β-SiC.

The initial mixture preferably employs up to 25 wt %, preferably up to 10 wt % of α-$Si_3N_4$ having a particle size <10 μm, preferably having a specific surface area of >5 $m^2/g$ (measured in accordance with BET). It is equally possible, however, to use β-$Si_3N_4$.

The blending of SiC, sintering aid and optionally an aid for producing green bodies is effected in a manner known per se, for example by means of stirring, intensive stirring, mixing-grinding or dry mixing.

If green body preparation aids were employed, these are removed by thermal treatment of the green bodies over a period of from 1 hour to 14 days at temperatures in the range between 100° and 600° C. in air or an inert atmosphere.

The mixture obtained is converted into the shape required in each particular case by means of known shaping processes such as, for example, die pressing, isostatic pressing, injection molding, extrusion, tape casting or slip casting.

The green bodies are then densified in the known manner customary for SiC sintered bodies. This can be effected, for example, by sintering under a gas atmosphere, axial or isostatic hot pressing.

For the purpose of hot isostatic pressing, the green body, so as to be protected against being attacked by the glass, is preferably coated with hexagonal BN, is enclosed within an enclosure sealed so as to be vacuum-tight and preferably made of glass, and is densified by the application of pressure by means of a gaseous pressure transmitting medium such as argon at temperatures of between 1800 and 2200° C. at a pressure of from 1000 to 2000 bar over a period of from 15 to 150 min in a high-pressure autoclave.

The sintered body thus produced is treated, after cooling, in a manner known per se for polishing silicon wafers. This is described, for example, in Ullmann's Encyclopedia of Industrial Chemistry, Vol A23, pp. 734–736, the hardness of the SiC material being reflected in the lapping/polishing grains used, preferably $B_4C$ or diamond slurries.

Care should preferably be taken during sintering to ensure that the silicon oxide present on the surface of the SiC powder (in the case of submicron powders usually present in an amount of from 0.5% to about 3%) is not removed, for example, by reduction reactions (e.g. with C or SiC). This is achieved e.g. by enclosing the sintered body in glass and sintering at high pressure (HiP) or by avoiding contamination with carbon in the green body or SiC powder.

It is also advantageous for sintering or redensification to be carried out at least for a time under $N_2$ gas or to employ small admixtures of $Si_3N_4$ in the initial mixture of the sintered bodies.

The sintered bodies thus produced are suitable, in particular, as a substrate for fabricating hard disks, for example in computers, since they meet the IDEMA (International Disk Drive Equipment and Material Association) requirements in the "specifications for rigid disks" with respect to the freedom from pores of the polished surface.

The following examples serve as further illustration of the invention.

EXAMPLE 1

570 g of $Y_2O_3$ (15.24 $m^2/g$) were blended with 430 g of $Al_2O_3$ (8.94 $m^2/g$) and heated for 2 h in a Naber furnace at 1600° C. The YAG ($3Y_2O_3.5Al_2O_3$) obtained was coarsely crushed in a crusher and then ground for 5 minutes in a planetary ball mill. 311.86 g of SiC (submicron powder having a specific BET surface area of 11.91 $m^2/g$) were blended with 13.65 g of YAG for 1 hour in a planetary ball mill comprising a SiC barrel and SiC balls, then freeze-dried and then deagglomerated in a rotor mill, a 500 μm screen being employed.

From the blend thus obtained, a green body was produced by cold isostatic pressing at 2000 bar in a rubber sleeve. This green body is coated with a thin layer of hexagonal BN by being dipped into BN slip.

The green body was then enclosed in a glass melt and sintered for 1 h at 1950° C. and 1950 bar of argon. During the heating-up process, 1 bar Ar was used up to 1200° C. and 1950 bar of Ar above this temperature.

The weight loss after sintering was 0.2%.

The sintered body thus obtained had a flexural strength of 450 MPa at room temperature and 166 MPa at 1200° C., a fracture toughness of 3.7 $MPam^{1/2}$ (sharp notch) at room temperature.

Disks were sawed from the sintered body. Conventional production procedures were adopted for polishing the disks i.e. by means of lapping and polishing with abrasive grains of various types and sizes as follows:

The disk-shaped sintered body underwent preliminary lapping for 20 min on a cast-iron lapping disk, employing a slurry of $B_4C$ F400 abrasive grain, followed by fine lapping for 30 min on a softer metal plate, e.g. aluminum, employing a slurry of 2–4 μm diamond abrasive grain, then finish-polishing for 30 min using 1 μm diamond grain on cloth and finally finish-polishing for 30 min using 0.1 μm diamond grain on cloth.

On its polished surface, the sintered body exhibited no pores having a diameter greater than 0.4 μm.

As transmission electron microscopy studies showed, the 2nd phase at the boundary to the SiC was amorphous over a width of 15 Å.

EXAMPLE 2

| | |
|---|---|
| Amount weighed in: | 311.86 g of SiC (submicron powder as Ex. 1)<br>22.75 g of YAG (prepared as described in Ex. 1)<br>6.7 g of A1N (5 $m^2/g$) |
| Processing: | as Example 1, the YAG additionally being admixed with the A1N |
| Green body: | produced as described in Ex. 1 |
| Sintering: | produced as described in Ex. 1 |
| Weight loss upon sintering: | 0.25% |
| Characteristics of the sintered body obtained Flexural strength: | 400 MPa at room temperature<br>200 MPa at 1200° C. |
| Fracture toughness: (sharp notch). | 3 $MPam^{1/2}$ at room temperature |

Disks were sawed from the sintered body.

The disk-shaped sintered body underwent preliminary lapping for 20 min on a cast-iron lapping disk, employing a slurry of $B_4C$ F400 abrasive grain, followed by fine lapping for 30 min on a softer metal plate, e.g. aluminum, employing a slurry of 2–4 μm diamond abrasive grain, then finish-polishing for 30 min using 1 μm diamond grain on cloth and finally finish-polishing for 30 min using 0.1 μm diamond grain on cloth.

On its polished surface, the sintered body exhibited no pores having a diameter greater than 0.4 μm.

As transmission electron microscopy studies showed, the 2nd phase at the boundary toward the SiC was amorphous over a width of 15 Å.

EXAMPLE 3

261.76 g of SiC (15.1 $m^2/g$; 2.5% of $SiO_2$), 32.05 g of $Y_2O_3$ (15.24 $m^2/g$) and 9.15 g of AlN (5 $m^2/g$) were blended in an attritor mill for 3.5 h at 1000 rpm in isopropanol, using $Si_3N_4$ grinding balls. The mixture was then dried in a rotary evaporator and drying oven (72 h/55° C.), followed by deagglomeration using a 150 μm screen.

The green body was produced from the mixture by means of cold isostatic pressing at 3000 bar.

This was followed by sintering for 30 min at 1925° C. under 1 bar of $N_2$ and redensification for 60 min at 1925° C. and 15 bar $N_2$.

The weight loss upon sintering was 2.5%.

The sintered body obtained had the following characteristics:

Fracture toughness 3 $MPam^{1/2}$ (sharp break)

Disks were sawed from the sintered body. The disks were polished by means of lapping and polishing with abrasive grains of various types and sizes as follows: The disk-shaped sintered body underwent preliminary lapping for 20 min on a cast-iron lapping disk, employing a slurry of $B_4C$ F400 abrasive grain, followed by fine lapping for 30 min on a softer metal plate, e.g. aluminum, employing a slurry of 2–4 μm diamond abrasive grain, then finish-polishing for 30 min using 1 μm diamond grain on cloth and finally finish-polishing for 30 min using 0.1 μm diamond grain on a cloth.

On its polished surface, the polished sintered body exhibited no pores having a diameter greater than 0.4 μm.

As transmission electron microscopy studies showed, more than 10% of the 2nd phase was an amorphous phase.

Comparative Example 1

(Additives and sintering as in example No. 28 of U.S. Pat. No. 5,298,470)

| | |
|---|---|
| Amount weighed in: | 291.09 g of SiC (12 $m^2/g$, 0.4% of O)<br>10.9 g of YAG<br>3.9 g of A1N (5 $m^2/g$) |
| Processing: | preparation of YAG powder as in the 1st example, but starting from $Y_2O_3$ with 7$m^2/g$.<br>Further processing as in Example 1. |
| Green body: | Cold isostatic pressing at 2000 bar. |
| Sintering: | 1900 ° C./1 bar of argon/60 min.<br>2050° C./1 bar of argon/60 min (redensification) |
| Weight loss: | 3.5% |
| Fracture toughness: | 6 $MPam^{1/2}$ |
| Flexural strength: | 600 MPa at room temperature |

Disks were sawed from the sintered body.

Polishing was carried out as described in Examples 1 to 3. It resulted in a polished surface with much spalling of the second phase. This produced pores in the polished surface, which had diameters up to about 10 μm.

The second phase (YAG) does not have any amorphous boundaries but adjoins the SiC grains as a crystalline phase, as shown by TEM studies.

EXAMPLE 4

| | |
|---|---|
| Amount weighed in: | 295 g of SiC (Submicron powder as Ex. 1)<br>12.88 g of YAG<br>6.28 of A1N (5 $m^2/g$) |

-continued

| | |
|---|---|
| This was processed as described in Comparative Example 1. | |
| Green body: | Die pressing at 950 bar |
| Sintering: | 1970° C./5 bar of argon/45 min<br>1970° C./25 bar of $N_2$/45 min<br>(redensification) |
| Weight loss: | 0.5% |
| Fracture toughness: | 3.0 $MPam^{1/2}$ (sharp break) |
| Flexural strength: | 4.20 MPa at room temperature |

Polishing was carried out as described in Comparative Example 1.

On its polished surface, the polished sintered body exhibited no pores having a diameter greater than 0.4 $\mu$m.

As transmission electron microscopy studies showed, the 2nd phase at the boundary to the SiC was amorphous over a width of 15 Å.

EXAMPLE 5

| | |
|---|---|
| Amount weighed in: | 294.5 g of SiC (submicron powder as Ex. 1)<br>9.92 g of $Al_2O_3$ (8.94 $m^2/g$)<br>5.58 g of $Y_2O_3$ (7 $m^2/g$) |
| Processing: | analogous to Comparative Example 1 |
| Green body: | Cold isostatic pressing at 2000 bar |
| Sintering: | 1970° C./5 bar of argon/45 min<br>1970° C./15 bar of $N_2$/45 min<br>(redensification) |
| Weight loss: | 2.1% |
| Fracture toughness: | 3.1 $MPam^{1/2}$ |
| Flexural strength: | 435 MPa at room temperature<br>190 MPa at 1200° C. |

Polishing was carried out as described in Example 1.

On its polished surface, the sintered body exhibited no pores having a diameter greater than 0.4 $\mu$m.

As transmission electron microscopy studies showed, the 2nd phase at the boundary to the SiC was amorphous over a width of 15 Å.

We claim:

1. A hard disk for magnetic disk drives having a substrate fabricated from a dense sintered body having a polished surface which a) comprises from 82 to 98 wt % of SiC, the SiC being present in the hard disk as a crystalline first phase, and b) comprises from 2 to 8 wt % of a sintering aid, from 0.5 to 8 wt % of which is selected from the group consisting of reaction products of $Al_2O_3$ with $Y_2O_3$, mixtures of at least one nitrogen-containing aluminum compound with reaction products of $Al_2O_3$ with $Y_2O_3$, and mixtures of at least one rare earth oxide with at least one nitrogen-containing aluminum compound and/or $Al_2O_3$, and from 0 to 7.5 wt % nitridic silicon compounds, the sintering aid being present in the hard disk as a second phase and optionally further phases, wherein the second phase and optionally the further phases are either amorphous to an extent of more than 10 vol % or present in amorphous form at an interface to the first phase to a width of at least ≧5 Å, and the polished surface of the hard disk does not contain any pores having a diameter >1 $\mu$m, the hard disk being produced by blending 82 to 98 wt % of a SiC powder with from 2 to 8 wt % of said sintering aid and optionally conventional aids for producing a green body, shaping the blend to obtain a green body, sintering the green body at a temperature of from 1800 to 2200° C. over a period of from 15 to 300 min. under an $N_2$ or argon atmosphere and redensifying this hard disk for up to 150 min. at an elevated $N_2$ pressure up to 2000 bar and then optionally sawing, and lapping and polishing this sintered body.

2. The hard disk as claimed in claim 1 which employs sintering aids selected from the group consisting of yttrium aluminum garnet (YAG), yttrium aluminum melilite (YAM), yttrium aluminum perovskite (YAP), a mixture of $Al_2O_3$ with $Y_2O_3$, a mixture of AlN with $Y_2O_3$, a mixture of $Al_2O_3$ with AlN and with $Y_2O_3$ and a mixture of YAG, YAM or YAP with AlN.

3. The hard disk as claimed in claim 1 wherein more than 50 vol % of the sintering aid is present in an amorphous phase.

4. The hard disk as claimed in claim 1 wherein more than 80 vol % of the sintering aid is present in an amorphous phase.

5. The hard disk as claimed in claim 1 which, on its polished surface, does not contain any pores having a diameter >0.8 $\mu$m.

6. The hard disk as claimed in claim 1 which, on its polished surface, does not contain any pores having a diameter >0.4 $\mu$m.

* * * * *

UNITED STATES PATENT AND TRADEMARK OFFICE

CERTIFICATE OF CORRECTION

PATENT NO. : 5,898,008

DATED : April 27, 1999

INVENTOR(S) : Helmut Kolker, et al

It is certified that error appears in the above-identified patent and that said Letters Patent is hereby corrected as shown below:

On the title page, item [73];

"Elektroschmelzwerk Kempten GmbH" should read --Wacker-Chemie GmbH--

Signed and Sealed this

Twenty-eighth Day of September, 1999

Attest:

Q. TODD DICKINSON

*Attesting Officer* *Acting Commissioner of Patents and Trademarks*